Patented Mar. 28, 1950

2,502,001

UNITED STATES PATENT OFFICE 2,502,001

ALKYLATION OF AROMATIC HYDROCARBONS WITH TERTIARY ALIPHATIC MERCAPTANS

Charles F. Feasley, Woodbury, N. J., assignor to Socony-Vacuum Oil Company, Incorporated, a corporation of New York No Drawing. Application March 12, 1946, Serial No. 653,938

17 Claims. (Cl. 260—671)

This invention relates generally to the alkylation of aromatic compounds, and is more particularly concerned with the production of valuable products by the catalytic alkylation of aromatic hydrocarbons and of phenols with novel alkylating agents, in the presence of alkylation catalysts of the silica-alumina type.

Alkylation reactions are well known in the art and connote the introduction of an alkyl group into an organic compound, usually a hydrocarbon, under conditions of temperature, pressure and time ordinarily referred to in the art as alkylating conditions. Generally speaking, the temperature and to a certain extent, the pressure and time of reaction employed in alkylation operations depend upon whether the alkylation is effected in the absence or presence of alkylation catalysts. The two methods are generally referred to as thermal and catalytic alkylation, respectively. Several substances and mixtures of substances have been proposed as alkylation catalysts. Sulfuric acid, phosphoric acid, hydrofluoric acid, metal phosphates, activated clays and the like, and metal and nonmetal halides, especially those known in the art as Friedel-Crafts catalysts, such as aluminum chloride and boron trifluoride, have found wide application as alkylation catalysts.

In alkylation reactions, the alkyl group is supplied by a variety of substances accordingly known in the art as alkylating agents. Olefinic hydrocarbons, alkyl halides, alcohols, aralkyl halides, and less frequently, organic and inorganic esters, ethers, alkyl sulfates and alkene oxides have been proposed as alkylating agents. For commercial considerations, olefinic hydrocarbons have been the most widely used alkylating agents. However, one of the problems to be considered in operations where olefinic hydrocarbons are employed as alkylating agents is the extensive polymerization of the olefinic hydrocarbon which occurs concurrently with the alkylation reaction. This secondary reaction is undersirable from two standpoints, namely, in the first place, the polymers thus produced contaminate the alkylate, and in the second place, useful reactant is utilized in the production of an undesired contaminant. Several processes have been proposed to obviate the occurrence of polymerization; nevertheless, polymerization takes place to varying degrees.

I have now found that alkylates in good yields and substantially free from polymers can be obtained efficiently and simply by using tertiary aliphatic mercaptans as alkylating agents.

Recently, Lee and Dougherty (Jl. Org. Chem., 4, 48) have reported the alkylation of benzene with benzyl mercaptan in the presence of at least one molecular weight of aluminum chloride as catalyst. However, they were unsuccessful in all attempts to alkylate benzene with primary aliphatic mercaptans and more specifically, with ethyl mercaptan and n-amyl mercaptan. In explaining the reaction between benzene and benzyl mercaptan, an aralkyl mercaptan, Lee and Dougherty postulated that mercaptans may be used as alkylating agents provided that they contain a thiomethylene group, i. e.,

the alkyl radical being furnished by cleavage of the carbon-sulfur linkage. Accordingly, in benzyl mercaptan:

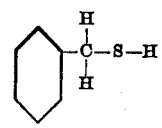

since the phenyl group is more negative than a methyl group, when both are compared with hydrogen, it is possible to achieve cleavage of the carbon-sulfur linkage in the presence of aluminum chloride. As examples of compounds suitable as alkylating agents, Lee and Dougherty mentioned benzyl mercaptan, benzyl sulfide and s-trithiane.

I have discovered that in the presence of alkylation catalysts of the silica-alumina type, tertiary aliphatic mercaptans are suitable alkylating agents for alkylating aromatic hydrocarbons and phenols. It must be noted that tertiary aliphatic mercaptans do not possess the characteristics of the alkylating agents used and postulated to be essential by Lee and Dougherty.

Accordingly, it is an object of the present invention to provide an efficient process for alkylating aromatic hydrocarbons. Another object is to provide an efficient process for alkylating phenols. A very important object is to provide a process for alkylating aromatic hydrocarbons and phenols with tertiary aliphatic mercaptans. A more specific object is to afford a process for alkylating aromatic hydrocarbons and phenols with tertiary aliphatic mercaptans in the presence of alkylation catalysts of the silica-alumina type. Other objects and advantages of the present invention will become apparent to those skilled in the art from the following description.

Broadly stated, the present invention comprises a process for alkylating alkylatable aromatic hydrocarbons and phenols which includes contacting such an aromatic compound with a tertiary aliphatic mercaptan in the presence of an alkylation catalyst of the silica-alumina type, in a reaction zone under alkylating conditions.

Using tertiary butyl mercaptan as a typical example of the novel alkylating agents of the present invention, the reaction desired can be represented by the following equation:

(1) 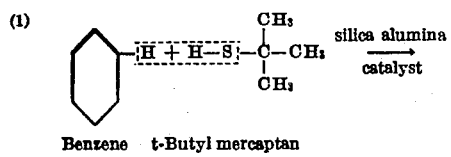

Benzene   t-Butyl mercaptan

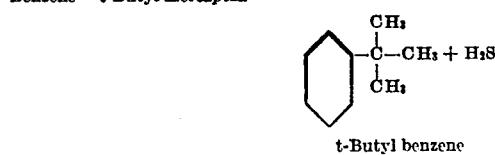

t-Butyl benzene

Under suitable reaction conditions, a second molecule of tertiary butyl mercaptan may react with the tertiary butyl benzene to yield ditertiary butyl benzene:

(2) 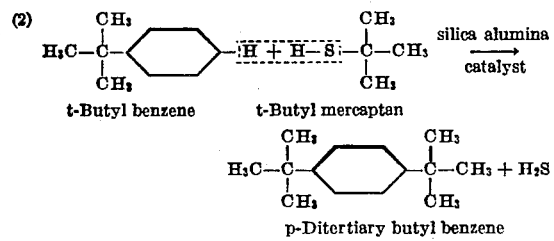

t-Butyl benzene    t-Butyl mercaptan p-Ditertiary butyl benzene

The tertiary aliphatic mercaptans to be used as alkylating agents in accordance with the process of the present invention may be derived from any suitable source, as is well understood in the art. In this connection, it should be noted that my process is of considerable commercial importance in that it furnished a field of utilization for the mercaptans recovered in various processes for the desulfurization of gasoline and natural gas, sweetening processes and solutizer operations. Under the conditions of my process, primary and secondary aliphatic mercaptans do not function as alkylating agents. For example, attempts to alkylate benzene with n-butyl mercaptan and with isopropyl mercaptan under reaction conditions otherwise similar to those used for tertiary butyl mercaptan, produced no alkylation and only a trace of alkyl benzene, respectively. Generally speaking, any tertiary aliphatic mercaptan may be used as the alkylating agent. Tertiary butyl mercaptan, tertiary amyl mercaptan and tertiary hexyl mercaptan may be mentioned by way of non-limiting examples.

In accordance with the process of the present invention, any aromatic hydrocarbon or phenol ordinarily amenable to alkylation may be used as the aromatic reactant. Accordingly, any alkylatable aromatic hydrocarbon, such as benzene and naphthalene, as well as alkyl derivatives of aromatic hydrocarbons, such as toluene and xylene, may be used in my process. Similarly, any alkylatable phenol may be employed in the process of the present invention. Phenol, resorcinol, naphthol and hydroquinone may be mentioned by way of non-limiting examples of phenols utilizable in my process.

As stated hereinbefore, the reaction of the process of my invention is carried out in the presence of alkylation catalysts of the silica-alumina type. These catalysts are well known in the art and include natural clays as well as synthetic adsorbent composites of silica and at least one amphoteric metal oxide. By way of non-limiting examples, the amphoteric metal oxide may be alumina, zirconia, ceria, thoria and the like. For economy, I prefer to use a silica-alumina catalyst. It must be understood, however, that alumina may be partially replaced by one or more of the other metal oxides, and in general, any metal oxide, with the exception of alkali metal oxides, may replace part of the alumina. Attapulgus clay; silica-alumina gel; synthetic silica-alumina catalysts used in operations involving the cracking of petroleum products, such as Houdry clays, bead catalyst, and those known to those familiar with the art under the name of "Super-Filtrol," may be mentioned as specific examples of catalysts utilizable in the process of the present invention. It must be clearly understood that these silica-alumina catalysts may be used in the form of pellets, beads, spherules, and the like, and that they may be regenerated in accordance with the conventional methods of regeneration. There appears to be nothing critical in the amount of catalyst employed. Ordinarily, I use between about 10% and about 100% of catalyst, based on the weight of the charge.

In my process it is desirable to keep the concentration of the alkylating agent relatively low during the alkylation reaction, in order to eliminate as much secondary reactions as possible. Accordingly, it is advisable to maintain the concentration of the alkylating agent in the charge below about 25% by volume, and preferably between about 10% and about 20% by volume. In batch operation this may be effected by adding the tertiary aliphatic mercaptan slowly to the aromatic reactant-catalyst mixture; while in continuous operation, this may be effected by introducing the tertiary aliphatic mercaptan at a number of points in the reaction zone, or by adding the alkylating agent to a recirculating mass of excess aromatic reactant, reaction product and catalyst.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the reactants be intimately contacted with each other and with the catalyst. This may be effected in several ways, as is well known in the art.

Generally speaking, the alkylation conditions of my process are those commonly employed in alkylation processes involving the use of silica-alumina alkylation catalysts. I ordinarily use temperatures varying between about 140° F. and about 700° F. and pressures varying between atmospheric pressure and about 10,000 pounds per square inch. The time of reaction depends upon the temperature and to a certain extent upon the pressure. Ordinarily, a reaction time varying between about one minute and about 12 hours is satisfactory.

The following detailed example is for the purpose of illustrating a mode of carrying out the process of my invention, it being clearly understood that the invention is not to be considered as limited to the specific manipulations and conditions set forth in the example. As it will be apparent to those skilled in the art, other silica-alumina alkylation catalysts, and a wide variety of other aromatic reactants and of other tertiary aliphatic mercaptans within the scope of my invention, may be used as the alkylation reactants.

85.5 grams of tertiary butyl mercaptan (0.95 mole), 500 c. c. of thiophene-free benzene and 50 grams of Super-Filtrol pellets were charged into a 1000 c. c. stainless steel Aminco rocking bomb. The temperature was raised to 420–430° F. and held at this temperature for a period of six hours. The bomb was then chilled and vented. The reaction mixture was removed from the bomb and the catalyst removed by filtration. The liquid was washed twice with a 20% aqueous solution of sodium hydroxide, and then washed twice with distilled water. The washed material was finally dried and then subjected to fractional distillation in a packed column having 12 theoretical plates. The various fractions were identified by infrared spectrographic analysis. The results obtained were as follows:

| Fraction | Weight in Grams | Compound |
| --- | --- | --- |
| 320-335° F | 61 | t-butyl-benzene. |
| Residue | 27.2 | di-t-butyl benzene. |

This accounts for 78% of the tertiary butyl mercaptan as alkyl benzenes.

It will be apparent that the present invention provides an efficient process for alkylating aromatic hydrocarbons and phenols. The process is of considerable value in making available relatively inexpensive alkyl aromatic compounds which are useful, for instance, as intermediates in organic synthesis, as solvents, and as constituents of motor fuels.

I claim:

1. The process for producing tertiary butyl benzenes, which comprises contacting benzene with tertiary butyl mercaptan, in the presence of an alkylation catalyst consisting essentially of a synthetic adsorbent composite of silica and alumina, in a reaction zone under alkylating conditions including a temperature falling within the range varying between about 140° F. and about 700° F.

2. The process for producing tertiary butyl benzenes, which comprises contacting benzene with tertiary butyl mercaptan, in the presence of an alkylation catalyst consisting essentially of a synthetic adsorbent composite of silica and at least one amphoteric metal oxide, in a reaction zone under alkylating conditions including a temperature falling within the range varying between about 140° F. and about 700° F.

3. The process for producing tertiary butyl benzenes, which comprises contacting benzene with tertiary butyl mercaptan, in the presence of an alkylation catalyst consisting essentially of a natural silica-alumina clay, in a reaction zone under alkylating conditions including a temperature falling within the range varying between about 140° F. and about 700° F.

4. The process for producing tertiary butyl benzenes, which comprises contacting benzenes with tertiary butyl mercaptan, in the presence of an alkylation catalyst consisting essentially of a silica and alumina composite, in a reaction zone under alkylating conditions including a temperature falling within the range varying between about 140° F. and about 700° F.

5. The process for alkylating benzene, which comprises contacting benzene with a tertiary aliphatic mercaptan, in the presence of an alkylation catalyst consisting essentially of a synthetic adsorbent composite of silica and alumina, in a reaction zone under alkylating conditions including a temperature falling within the range varying between about 140° F. and about 700° F.

6. The process for alkylating benzene, which comprises contacting benzene with a tertiary aliphatic mercaptan, in the presence of an alkylation catalyst consisting essentially of a synthetic adsorbent composite of silica and at least one amphoteric metal oxide, in a reaction zone under alkylating conditions including a temperature falling within the range varying between about 140° F. and about 700° F.

7. The process for alkylating benzene, which comprises contacting benzene with a tertiary aliphatic mercaptan, in the presence of an alkylation catalyst consisting essentially of a natural silica-alumina clay, in a reaction zone under alkylating conditions including a temperature falling within the range varying between about 140° F. and about 700° F.

8. The process for alkylating benzene, which comprises contacting benzene with a tertiary aliphatic mercaptan, in the presence of an alkylation catalyst consisting essentially of a silica and alumina composite, in a reaction zone under alkylating conditions including a temperature falling within the range varying between about 140° F. and about 700° F.

9. The process for alkylating alkyl benzenes, which comprises contacting an alkyl benzene with a tertiary aliphatic mercaptan, in the presence of an alkylation catalyst consisting essentially of a synthetic adsorbent composite of silica and alumina, in a reaction zone under alkylating conditions including a temperature falling within the range varying between about 140° F. and about 700° F.

10. The process for alkylating alkyl benzenes, which comprises contacting an alkyl benzene with a tertiary aliphatic mercaptan, in the presence of an alkylation catalyst consisting essentially of a synthetic adsorbent composite of silica and at least one amphoteric metal oxide, in a reaction zone under alkylating conditions including a temperature falling within the range varying between about 140° F. and about 700° F.

11. The process for alkylating alkyl benzenes, which comprises contacting an alkyl benzene with a tertiary aliphatic mercaptan, in the presence of an alkylation catalyst consisting essentially of a natural silica-alumina clay, in a reaction zone under alkylating conditions including a temperature falling within the range varying between about 140° F. and about 700° F.

12. The process for alkylating alkyl benzenes, which comprises contacting an alkyl benzene with a tertiary aliphatic mercaptan, in the presence of an alkylation catalyst consisting essentially of a silica and alumina composite, in a reaction zone under alkylating conditions including a temperature falling within the range varying between about 140° F. and about 700° F.

13. The process for alkylating an aromatic hydrocarbon, which comprises contacting said aromatic hydrocarbon with a tertiary aliphatic mercaptan, in the presence of an alkylation catalyst consisting essentially of a synthetic adsorbent composite of silica and alumina, in a reaction zone under alkylating conditions including a temperature falling within the range varying between about 140° F. and about 700° F.

14. The process for alkylating an aromatic hydrocarbon, which comprises contacting said aromatic hydrocarbon with a tertiary aliphatic mercaptan, in the presence of an alkylation catalyst consisting essentially of a synthetic adsorbent composite of silica and at least one amphoteric metal oxide, in a reaction zone under alkylation conditions including a temperature falling within the range varying between about 140° F. and about 700° F.

15. The process for alkylating an aromatic hydrocarbon, which comprises contacting said aromatic hydrocarbon with a tertiary aliphatic mercaptan, in the presence of an alkylation catalyst consisting essentially of a natural silica-alumina clay, in a reaction zone under alkylating conditions including a temperature falling within the range varying between about 140° F. and about 700° F.

16. The process for alkylating an aromatic hydrocarbon, which comprises contacting said aromatic hydrocarbon with a tertiary aliphatic mercaptan, in the presence of an alkylation catalyst consisting essentially of a silica and alumina composite, in a reaction zone under alkylating conditions including a temperature falling within the range varying between about 140° F. and about 700° F.

17. The process for producing tertiary butyl benzenes, which comprises contacting benzene with tertiary butyl mercaptan at a temperature falling within the range varying between about 140° F. and about 700° F., in the presence of an alkylation catalyst consisting essentially of a silica and alumina composite, in a reaction zone under alkylating conditions.

CHARLES F. FEASLEY.

REFERENCES CITED

The following references are of record in the file of this patent:

UNITED STATES PATENTS

| Number | Name | Date |
|---|---|---|
| 1,908,190 | Schollkopf | May 9, 1933 |
| 2,035,449 | Archibald et al. | Mar. 31, 1936 |
| 2,141,611 | Malishev | Dec. 27, 1938 |
| 2,403,013 | Meadow | July 2, 1946 |
| 2,409,080 | Thacker | Oct. 8, 1946 |
| 2,410,111 | Thomas | Oct. 29, 1946 |

OTHER REFERENCES

Malisoff et al., "Thermal Behavior of Sulfur Compounds In Hydrocarbon Solvents I. Aliphatic Hydrocarbons," Ind. Eng. Chem., vol. 23, pages 1114–1120 (Oct. 1931) (7 pages).